US006582031B2

United States Patent
Newton et al.

(10) Patent No.: US 6,582,031 B2
(45) Date of Patent: Jun. 24, 2003

(54) TRAINLINE COMMUNICATION CONTROLLER ASSEMBLY

(75) Inventors: Gary S. Newton, Adams, NY (US); Abraham Long, Jr., Black River, NY (US); Anthony W. Lumbis, Watertown, NY (US)

(73) Assignee: New York Air Brake Corporation, Watertown, NY (US)

(*) Notice: Subject to any disclaimer, the term of this patent is extended or adjusted under 35 U.S.C. 154(b) by 70 days.

(21) Appl. No.: 09/944,110

(22) Filed: Sep. 4, 2001

(65) Prior Publication Data

US 2002/0034058 A1 Mar. 21, 2002

Related U.S. Application Data

(60) Provisional application No. 60/232,859, filed on Sep. 15, 2000.

(51) Int. Cl.[7] ................................................ H05K 1/14
(52) U.S. Cl. ............................... 303/20; 303/3; 303/15; 303/128; 361/614
(58) Field of Search ................................. 361/600, 614, 361/610, 611, 640, 728, 729, 730, 735, 615–636; 303/20, 3, 15, 128

(56) References Cited

U.S. PATENT DOCUMENTS

| | | | | |
|---|---|---|---|---|
| 4,967,311 A | * | 10/1990 | Ferchau et al. | 361/614 |
| 6,098,006 A | * | 8/2000 | Sherwood et al. | 303/128 |
| 6,411,500 B1 | * | 6/2002 | Kaaden et al. | 361/614 |

* cited by examiner

Primary Examiner—Matthew C. Graham
(74) Attorney, Agent, or Firm—Barnes & Thornburg

(57) ABSTRACT

A trainline communication controller for placement on a rail car or locomotive of a train in order form a network having a housing with a front plate assembly which includes a plurality of external electrical receptacles. A plurality of circuits, including surface connectors, are positioned in the housing. A printed circuit board including connector smating directly with the surface connectors of the circuits and where in the receptacles are mounted on the printed circuit board.

22 Claims, 12 Drawing Sheets

TRAINLINE COMMUNICATION CONTROLLER ASSEMBLY

CROSS-REFERENCE

The Applicant claims priority from U.S. patent application Ser. No. 60/232,859 filed Sep. 15, 2000.

BACKGROUND AND SUMMARY OF THE INVENTION

The present invention relates to electropneumatic brake control on a train and more specifically to the electronic portion of the trainline controller.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as one hundred cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

A prior art system with electropneumatic train brake controls is illustrated in FIG. 1. An operator control stand 10 generally has a pair of handles to control the train braking. It controls a brake pipe controller 12 which controls the brake pipe 14 running through out the train. It also includes a trainline controller 16 with power source 17 which controls the trainline 18 which is a power line as well as an electrical communication line. The operator control stand 10, the brake pipe controller 12 and the trainline controller 16 are located in the locomotive.

Each car includes a car control device 20 having a car ID module 22 and a sensor 24 connected to the trainline 18. The pneumatic portion of the car brakes include a brake cylinder 26, a reservoir 28 and a vent valve 29. The car control device 20 is also connected to the brake pipe 14 and the trainline 18. The brake pipe controller 12 is available from New York Air Brake Corporation as CCBII® and described in U.S. Pat. No. 6,098,006 to Sherwood et al. The trainline controller 16 and the CCD 20 are also available from New York Air Brake as a product known as EP60°. The car control device 20 is described in U.S. Pat. No. 5,967,620 to Truglio et al and U.S. Pat. No. 6,049,296 to Lumbis et al. Each of these patents and products are incorporated herein as necessary for the understanding of the present patent.

The trainline controller 16 is shown in detail in FIG. 2. The operator control stand 10 includes EP Brake controller 30 and an operator interface unit or display 31 which are connected to a trainline communication controller 40. The trainline communication controller 40 is connected to the trainline 18 and receives 75 volts DC from the locomotive battery. It is also connected to the locomotive EP brake 30 and to the locomotive systems 32. The locomotivecontrol 16 also includes a trainline power controller 50 connected to the trainline 18. It is also connected to 75 volts DC from the locomotive as well as the trainline power supply 38. The trainline power supply 38 provides all of the voltage necessary for operation of the electronics of the trainline power controller as well as the trainline 18. The 230 volts are applied to the trainline 18 in the normal operational mode. The 24 volts are the volts that is applied to the trainline 18 during synchronization.

The example illustrated in FIG. 2 is for a lead locomotive and a trailing locomotive. The trainlines between the locomotives are connected by EP trainline connectors 34. The leading EP lineconnector 34 has a head end termination HETT 36 terminating the trainline. The trainline communications controller 40 controls the trainline and communication and the power through the trainline power controller 50. Although the trainline power controller 50 and the trainline power supply 30 are shown in a second locomotive, they may also be located in the leading locomotive. Also, it is anticipated that all of the locomotives will have a trainline communication controller and a trainline power line controller therein. Using multiple power sources to power the trainline is described in U.S. Pat. No. 5,907,193 to Lumbis. Testing the trainline before powering up is also described in U.S. Pat. No. 5,673,876 to Lumbis et al.

The current invention is an improved trainline communication controller which reduces the number of wires and discreet parts. Because the risk of failure increases with the number of wire sand connections, a primary purpose of the present invention is to reduce the number of required wires and connections. The instant invention reduces the number of required wires from 120 down to only six.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
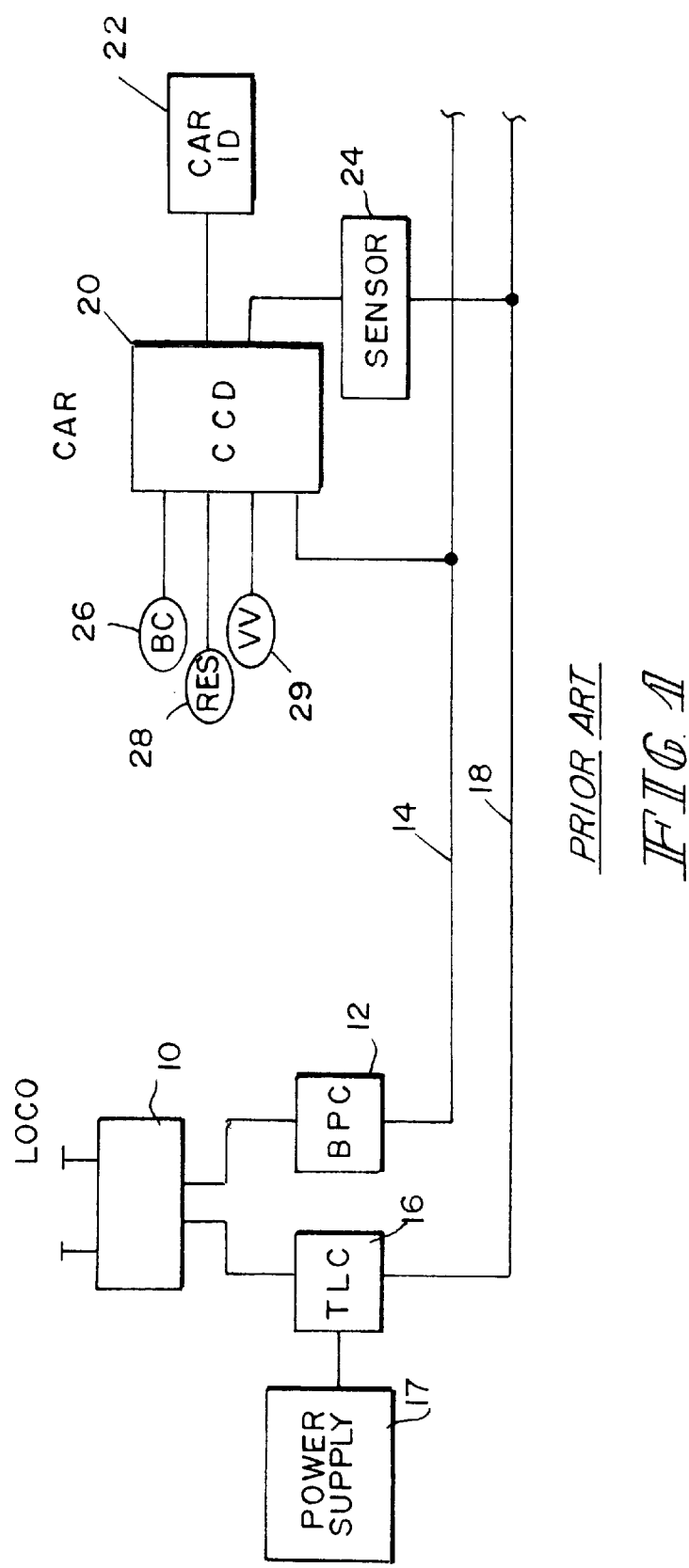
FIG. 1 is an electropneumatic brake control system of the prior art.
Figure 2:
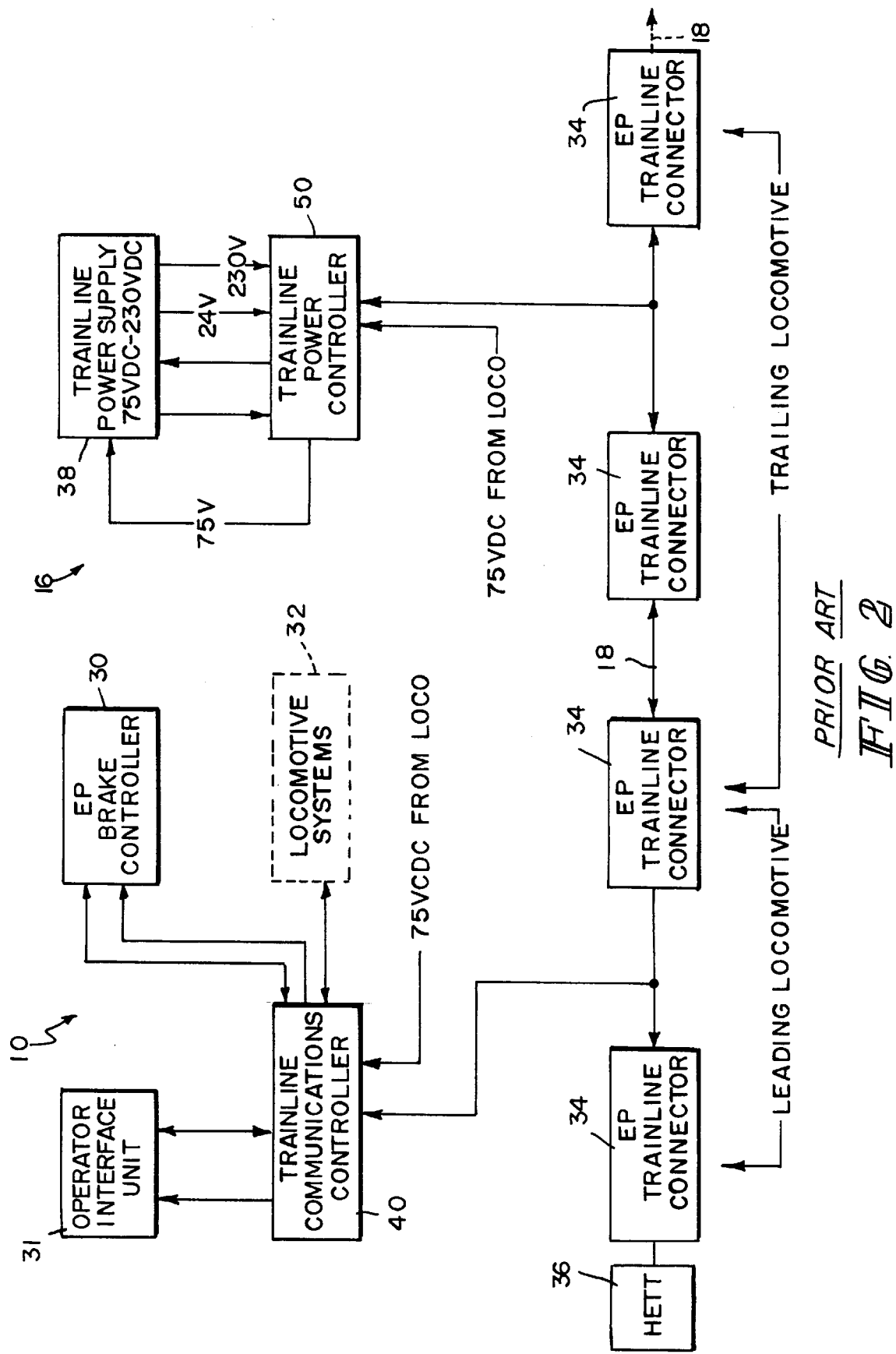
FIG. 2 is a block diagram of the trainline controller of the prior art.

A trainline communication controller of the prior art is shown in FIGS. 3–6. The controller 100 comprised a front plate 102 having a plurality of receptacles 110, a handle 108, and a diagnostic access panel 124 formed there on. Additionally, the controller 100 comprises a top plate 104 and side plates 106 mounted to an interior frame to form a closed structure.

Figure 3:
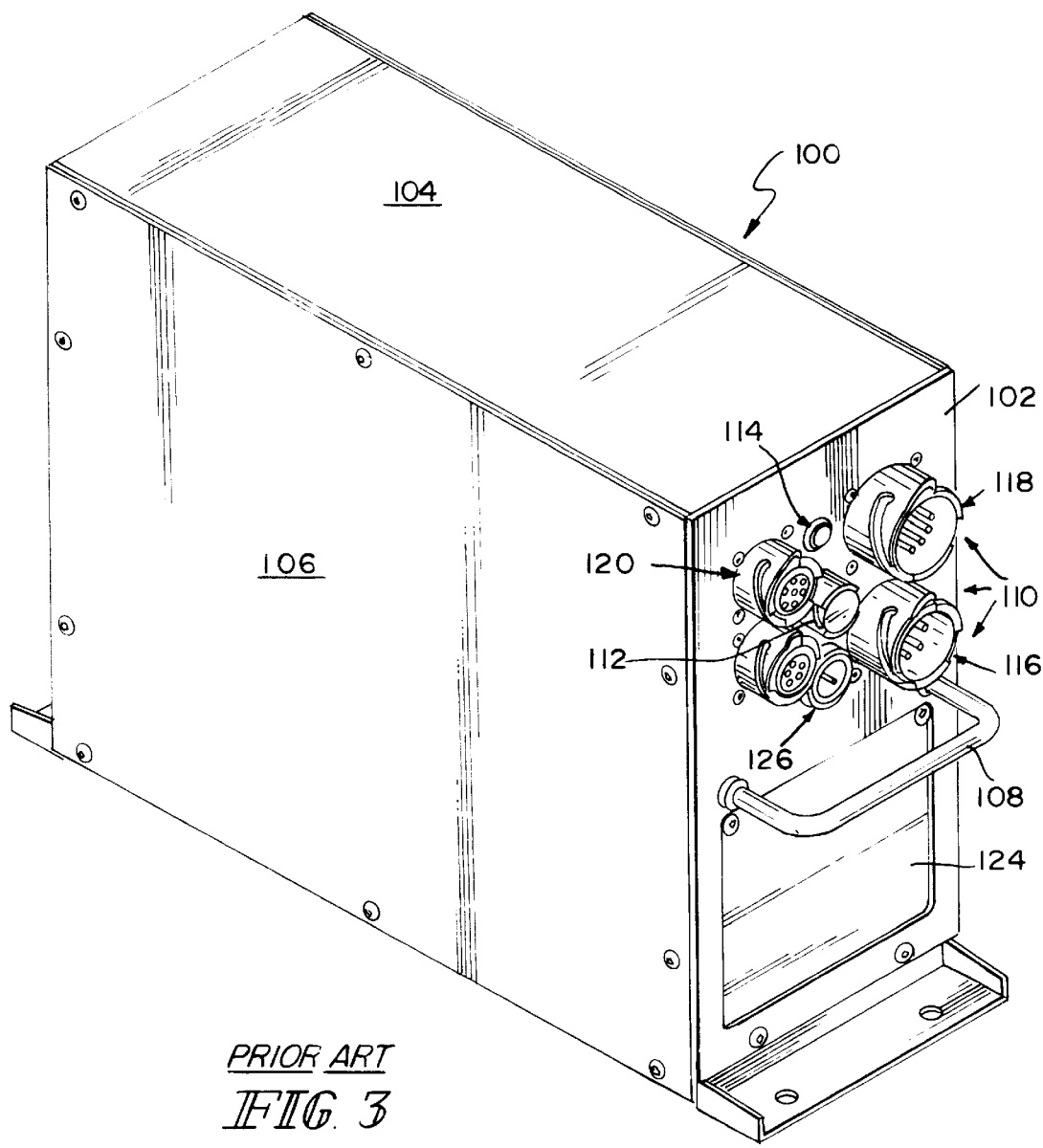
FIG. 3 is a perspective view of a trainline communication controller of the prior art.
Figure 4:
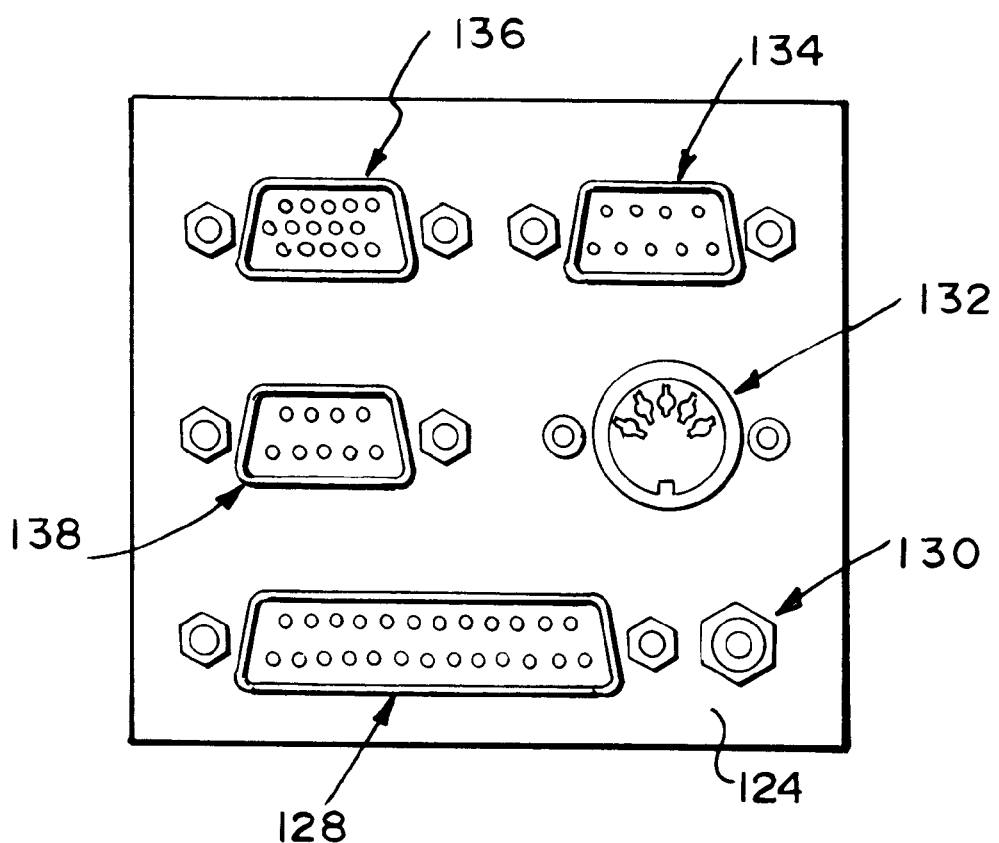
FIG. 4 is a close up of a diagnostic panel of a trainline communication controller of the prior art.

The front plate 102 has a non/off switch 112 as well as an input power fuse 126. Additionally, the front plate 102 has a non/off indicator 114. The front panel further included an input power receptacle 116, a locomotive input/output receptacle 118, an OIU receptacle 120, as well as an EBC receptacle 122. As shown in FIG. 3, the prior art controller 100 comprises a diagnostic accessory panel 124. As shown in FIG. 4, behind the diagnostic accessory panel 124 is a parallel port 128, a service pin (switch) 130, a keyboard connector 132, a RS-232 port 134, as well as a VGA port 136, and an echel on interface port 138. The electrical communication required between the ports behind the diagnostic panel 124 and the other ports and switches on front plate 102 was complex. Indeed, the prior art controller requires as many as 120 discrete wires.

Figure 5:
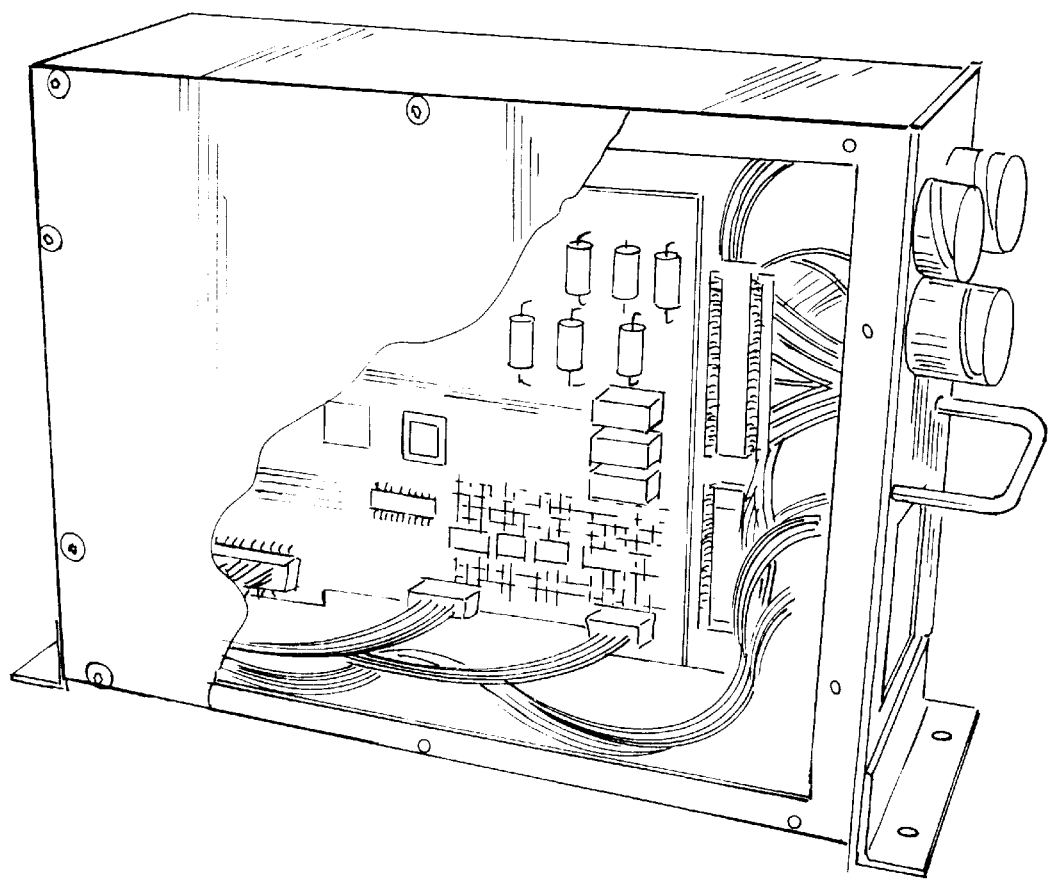
FIG. 5 shows the interior of a trainline communication controller of the prior art.
Figure 6:
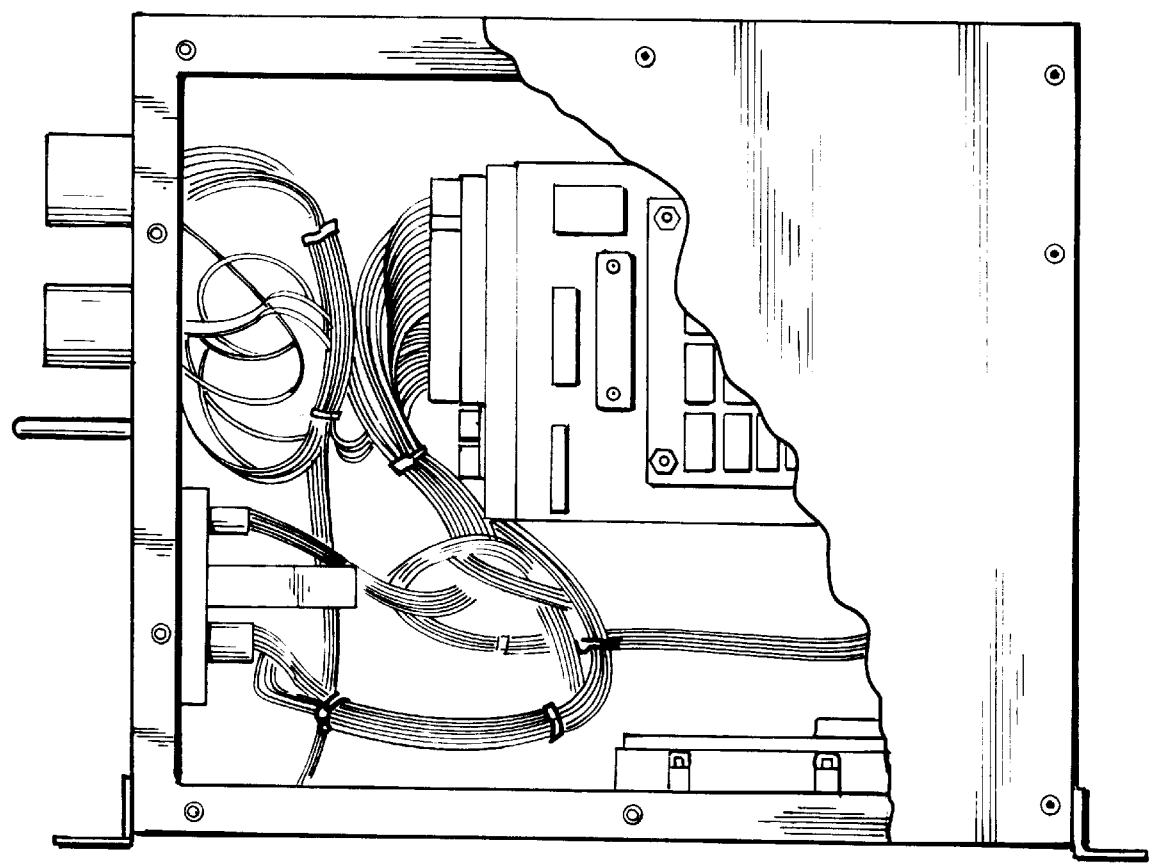
FIG. 6 shows another view of the interior of a trainline communication controller of the prior art.

FIGS. 5 and 6 show the complex inner make up of the trainline communication controller of the prior art. Circuit boards, wiring, ports and receptacles were cramped into the limited space. Because the trainline communication controller would be subjected to vibration, wires would often shake or break free, causing a failure of the system.

Figure 7:
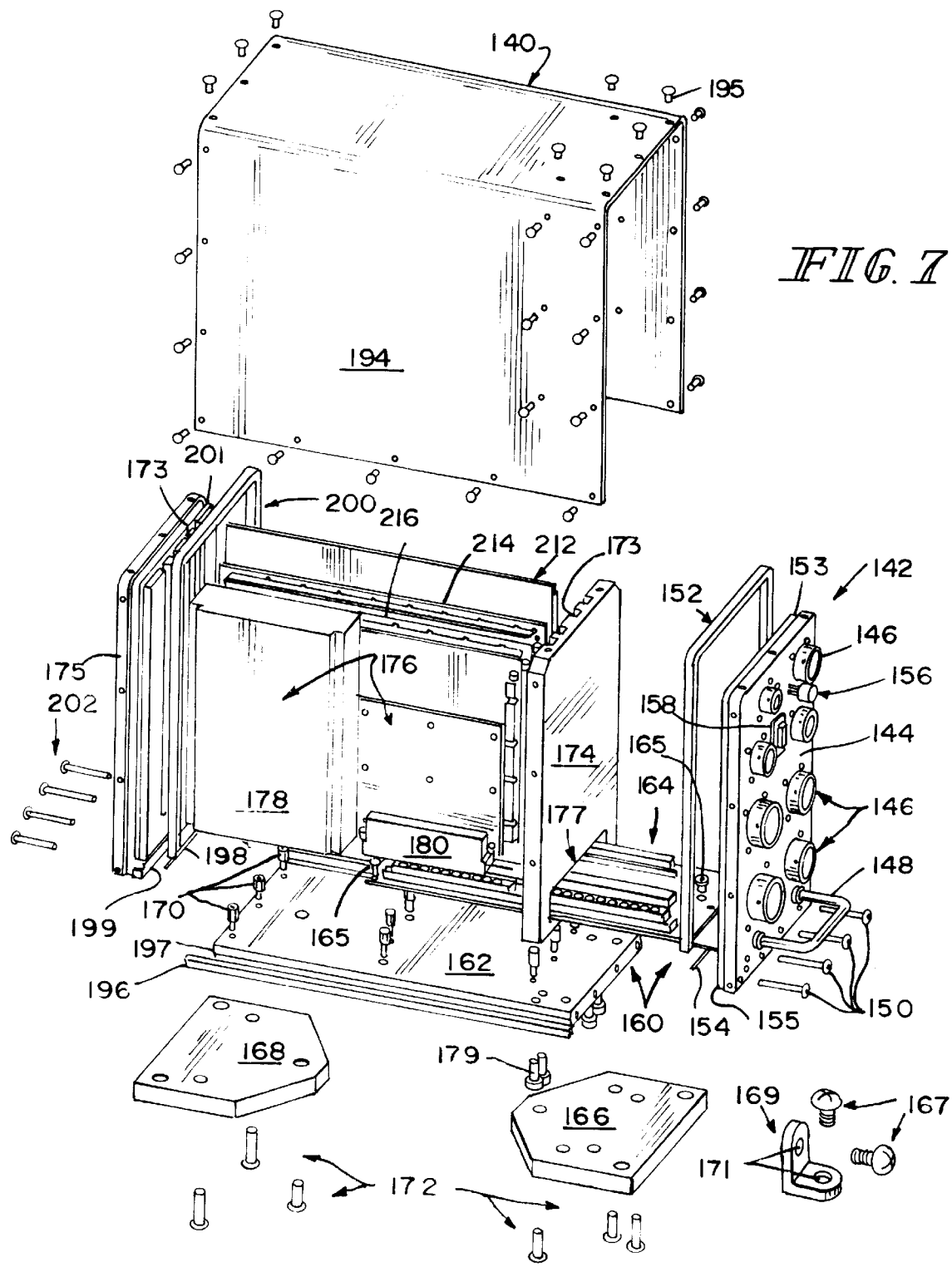
FIG. 7 is an exploded view of a trainline communication controller, according to the present invention.

FIG. 7 shows an exploded view of the trainline communication controller 140 of the present invention. The trainline communication controller 140 comprises a front plate assembly 142 having a front plate 144 and a front plate printed circuit board 145 (better seen in FIG. 8). The front plate assembly 142 includes receptacles 146 for receipt of plugs from various components of the trainline communication network (not shown).

Specifically, one receptacle 146 is provided for each of the PTU, the ether net, the electronic brake line controller (EBC), the operator interface unit (OIU), the RS-422 /distributed power (DP), the head end trainline termination (HETT), the RS-422 event recorder, and the POWER input/output, respectively. A handle 148 is mounted to the front plate 144.

As shown in FIG. 7, the front plate assembly 142 further includes a breather plug 156 configured to allow gases, possibly flammable gases, to escape from the interior region of the sealed enclosure. The front plate assembly 142 further includes a switch 158 configured to selectively activate and deactivate the controller 140. In order to form relatively air tight seals, a foam gasket 152, as well as an O-ring gasket 154 are received in recesses 153 and 155, respectively in the front plate assembly 142.

Figure 8:
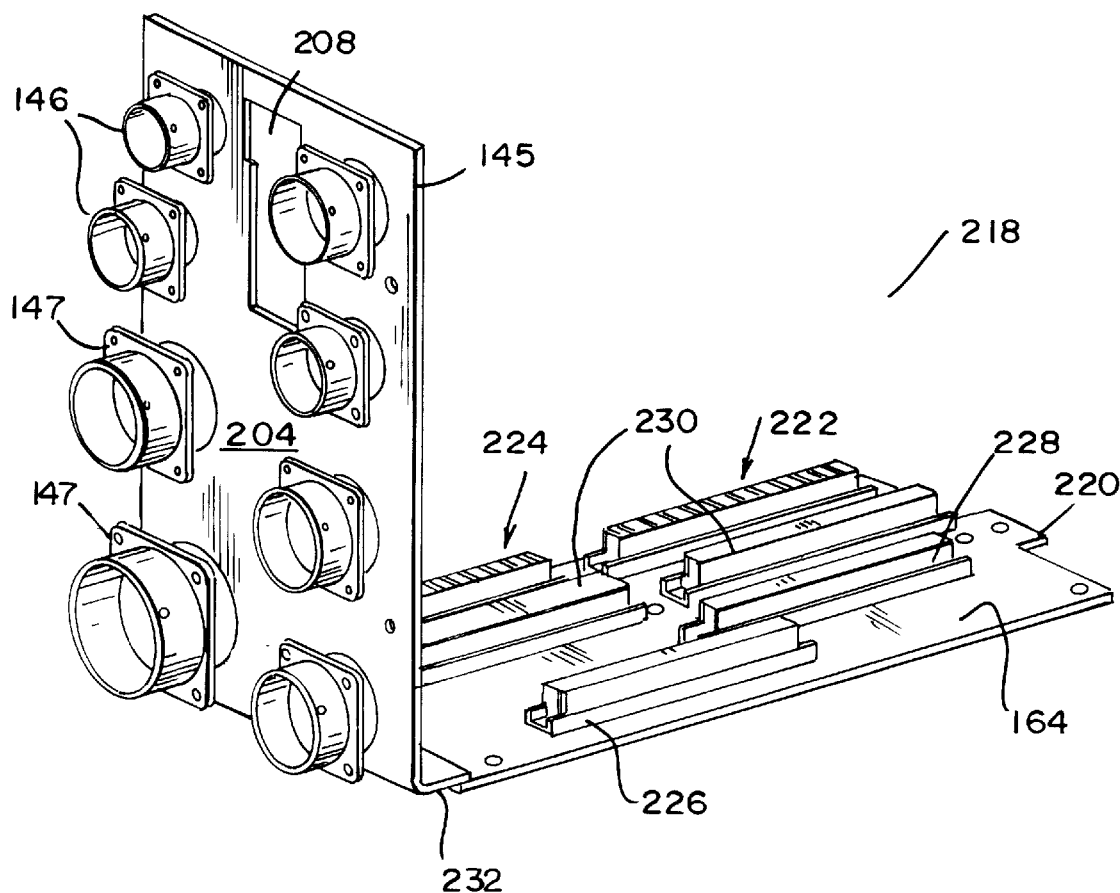
FIG. 8 is a perspective view showing the front plate printed circuit board assembly attached to the second plate printed circuit board assembly of the current invention.

The trainline communication controller 140 further includes a second plate assembly 160 which comprises a baseplate 162, as well as a second printed circuit board 164. As shown in FIG. 8, the front plate printed circuit board 145 is joined to the second plate printed circuit board 164 by an electrical bridge 232. Fasteners 165 secure the second printed circuit board 164 to fastener/spacer 171. Similar fasteners and spacers 170 are secured to the base plate 162 and a set-off between base plate 162 and second printed circuit board 164 of the second plate assembly 160.

The front plate assembly 142 may be firmly and air tightly attached to the base plate 162 of the second plate assembly 160 by screws 150 having washers. The trainline communication controller 140 may be mounted to a rail car (not shown) by front foot 166 and rear foot 168, which are mounted by using fasteners 172, to the base plate 162. In an alternate embodiment, a special LSIL-Shaped mounting 169 having apertures 171 may be used to fasten the front plate assembly 142 to a rail car (not shown) using fasteners 167.

The trainline communication controller 140 will further comprise at least one card guide wall 174. The card guide wall 174, as shown in the embodiment depicted in FIG. 7, will be secured to base 162 by fasteners 179 and front plate assembly 142 by fasteners 150. In this embodiment, a gasket 152 is positioned between card guide wall 174 and front plate assembly 142 in order to create an air tight seal there between. Card guide wall 174 will have grooves 173 for receipt of lateral edges of printed circuit board assemblies.

Card guide wall 174 will bear a pass through opening 177 to allow at least a portion of second printed circuit board 164 to pass there through.

The trainline communication controller 140 will further comprise a rear wall 175 which will be mounted to base 162 using fasteners 202. Rear wall 175 also has grooves 173 formed there on to guide and support a lateral edge of a printed circuit board assembly, which comprise the trainline communication controller 140.

An O-ring gasket 198 is positioned in recess 199 between a lower edge of real wall 175 and base plate 162 in order to create an air tight connection there between. Additionally, a foam gasket 200 is positioned around the perimeter 201 of rear wall 175 in order to form an air tight seal between rear wall 175 and cover 194. An additional gasket 196 is positioned on ledge 177 near an edge of base 162 in order to create an air tight seal between the edge of the base 162 and the cover 194.

Figure 9:
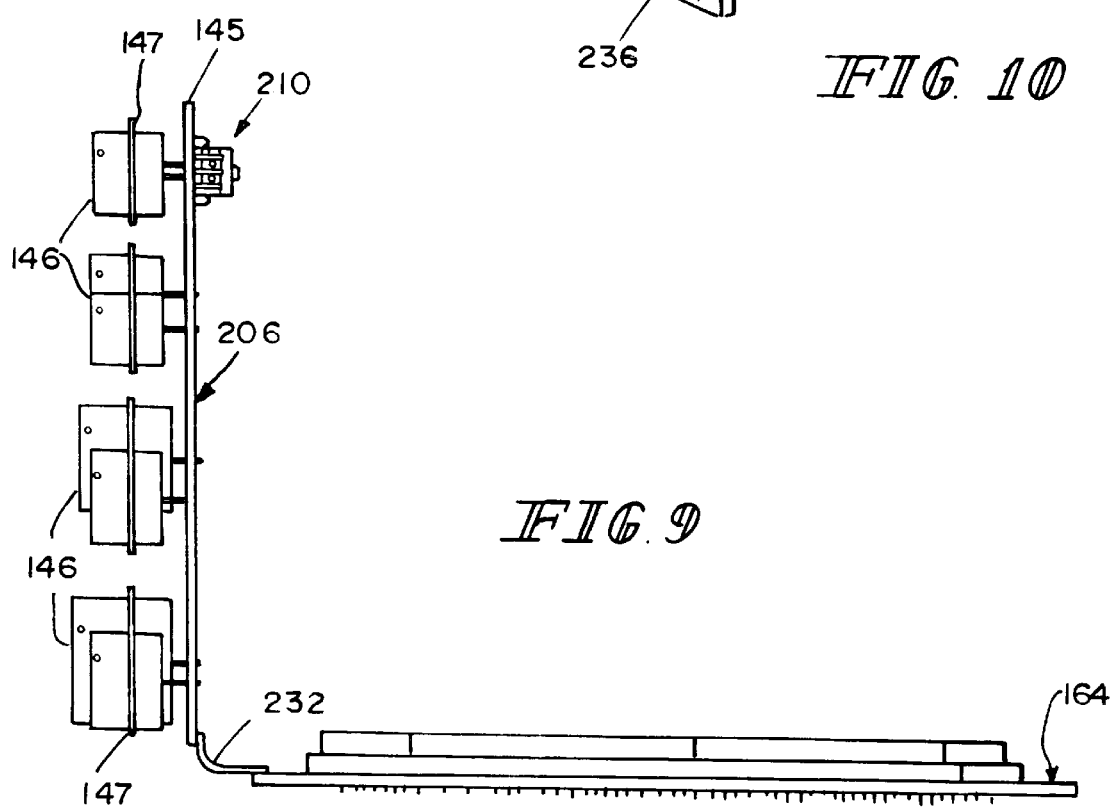
FIG. 9 is a side view of the items depicted in FIG. 8.

Referring specifically to FIGS. 8 and 9, the front plate printed circuit board 145 has a front face 204 with receptacles 146 mounted thereon. The receptacles 146 are configured to be in electric communication with printed circuitry on the rear face 206 of printed circuit board 145. Each receptacle 146 is equipped with a receptacle plate 147 which will become flush with the back of the front plate 144 as the front plate assembly 142 is put together. Printed circuit board 145 further comprises a switch aperture 208. Adjacent the switch aperture, a six-pin receiver 210 is positioned to receive a six-pin connector 242 (see FIGS. 9, 12).

The second printed circuit board 164 has a plurality of edge connectors 218 formed thereon. Additionally, second printed circuit board 164 comprises a tab 220 which will engage the rear wall 175. The plurality of edge connectors 218 specifically comprises a power supply edge connector 222, as well as a power supply filter edge connector 224, a single board computer (SBC) edge connector 226, a network interface edge connectors 228, and a pair input/output interface edge connectors 230.

Figure 10:
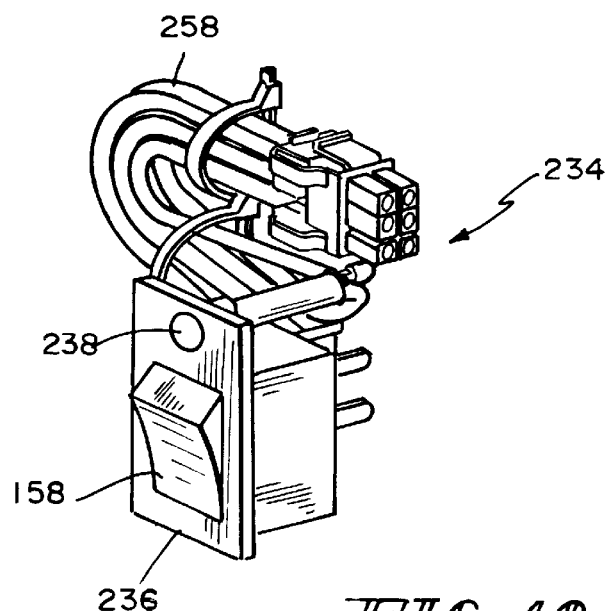
FIG. 10 is a perspective view of the switch assembly according to the present invention.

FIG. 10 shows switch assembly 234 having a switch 158 mounted on the front 236 of switch assembly 234. The front 236 further comprises an LED 238 configured to illuminate and give a diagnostic information to an observer.

The switch assembly 234 further comprises a wiring harness 258 carrying each of the individual wires from six-pin connector 242 to the switch assembly 234. The six pins 244 correspond to the positive and negative of the LED, the positive and negative of the trainline communication input, and the positive and negative of the trainline communication output.

Figure 11:
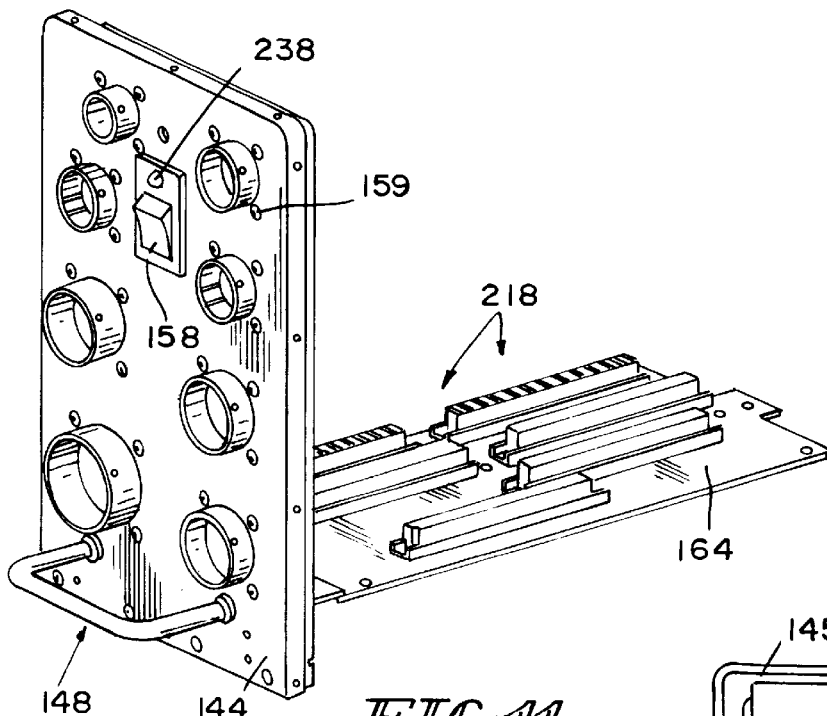
FIG. 11 is a perspective view showing the second plate printed circuit board assembly attached to the front plate assembly, according to the present invention.
Figure 12:
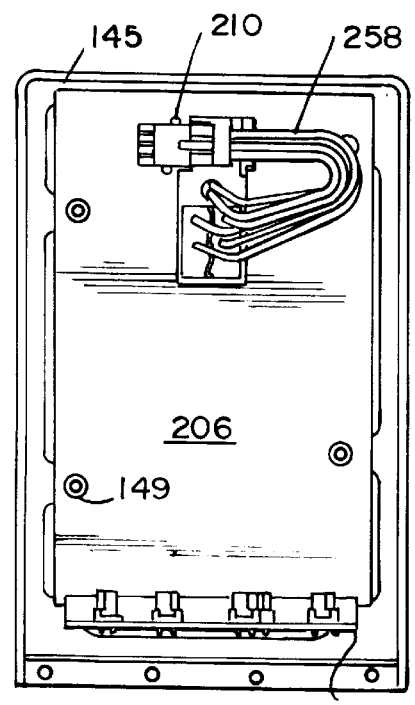
FIG. 12 is a view of the items as depicted in FIG. 11.
Figure 13:
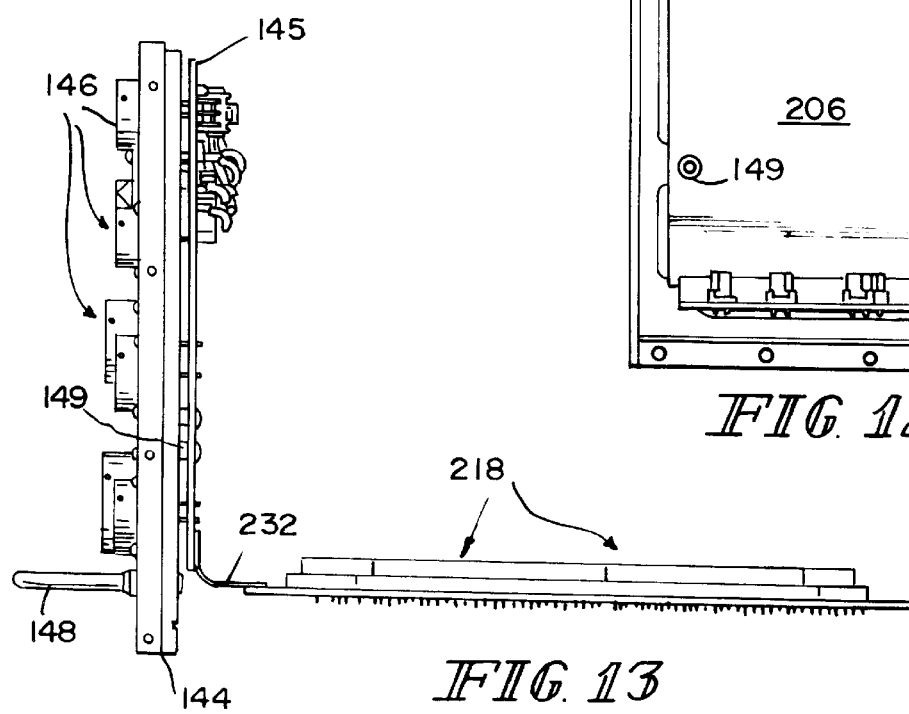
FIG. 13 is a side view of the items shown in FIG. 11.

FIGS. 11–13 show various views of the front plate assembly 144 attached via electrical bridge 232 to the second printed circuit board 164. Fasteners 159 extend through the front plate 144 to engage the receptacle plate 147 in order to bring the front plate 144 flush with the receptacle plate 147.

In contrast, a spacer and fastener 149 extends through the front plate printed circuit board 145 from the rear surface 206 and into a space to hold the printed circuit board 145 in a spaced apart relation to front plate 144.

Figure 14:
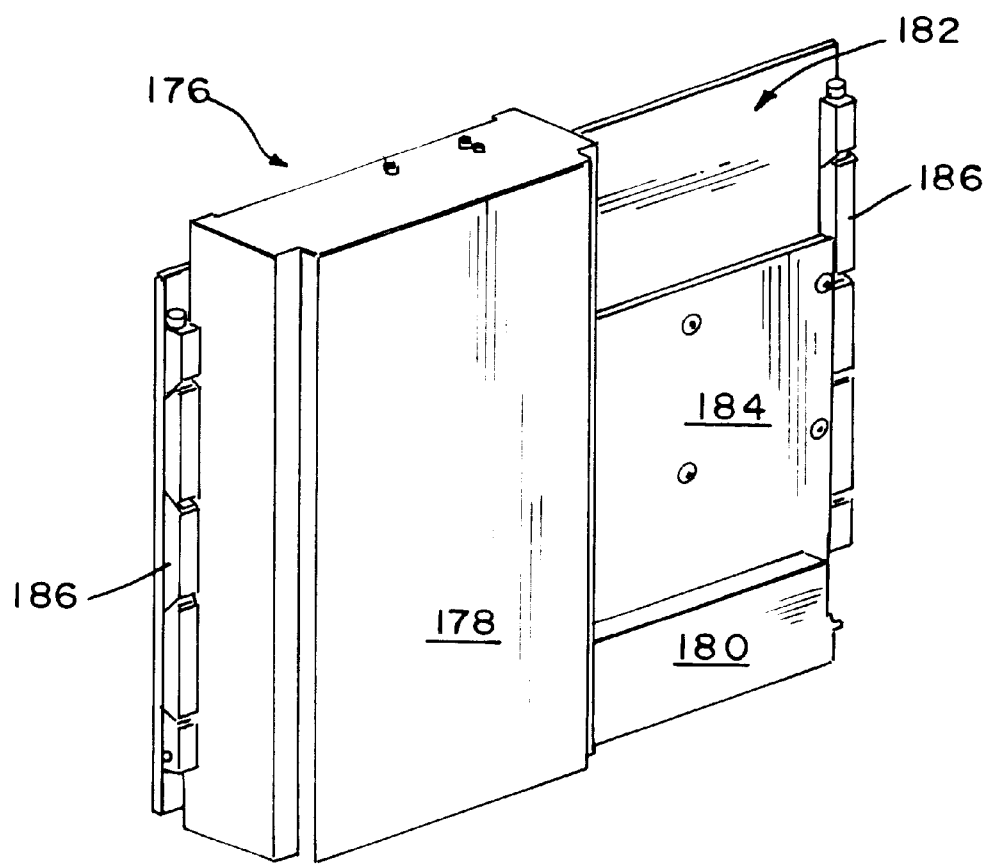
FIG. 14 is a perspective view of the power supply assembly, according to the present invention.
Figure 15:
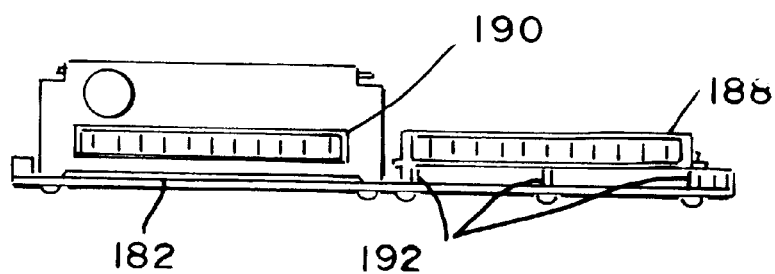
FIG. 15 shows a bottom view of the power supply assembly of FIG. 14, according to the present invention.

FIGS. 14 and 15 provide a close-up view of the power supply assembly 176. The power supply assembly 176 comprises a power supply 178, preferably a 50 watt power supply, firmly mounted to a mounting plate 182. Also, a power supply filter 180 is included and also coupled to the mounting plate 182. The mounting plate 182 is preferably aluminum, and provides a heat sink to absorb heat emitted by the power supply 178. The power supply assembly 176 further comprises a power supply printed circuit board 184 coupled to filter 180.

The power supply 178 bears a power supply edge connector 190, and the power supply filter 180 bears a power supply filter edge connector 188. The power supply filter 180 is coupled to printed circuit board 184 directly, and held in a spaced-apart relation with a mounting plate 182 by set offs 192 which hold and maintain the filter 180 and printed circuit board 184 in a spaced-apart relation to the mounting plate 182.

The power supply assembly 176 will be held in grooves 173 of guide wall 174, and rear wall 175 by card locks 186 positioned at both lateral edges of the power supply assembly 176.

Figure 16:
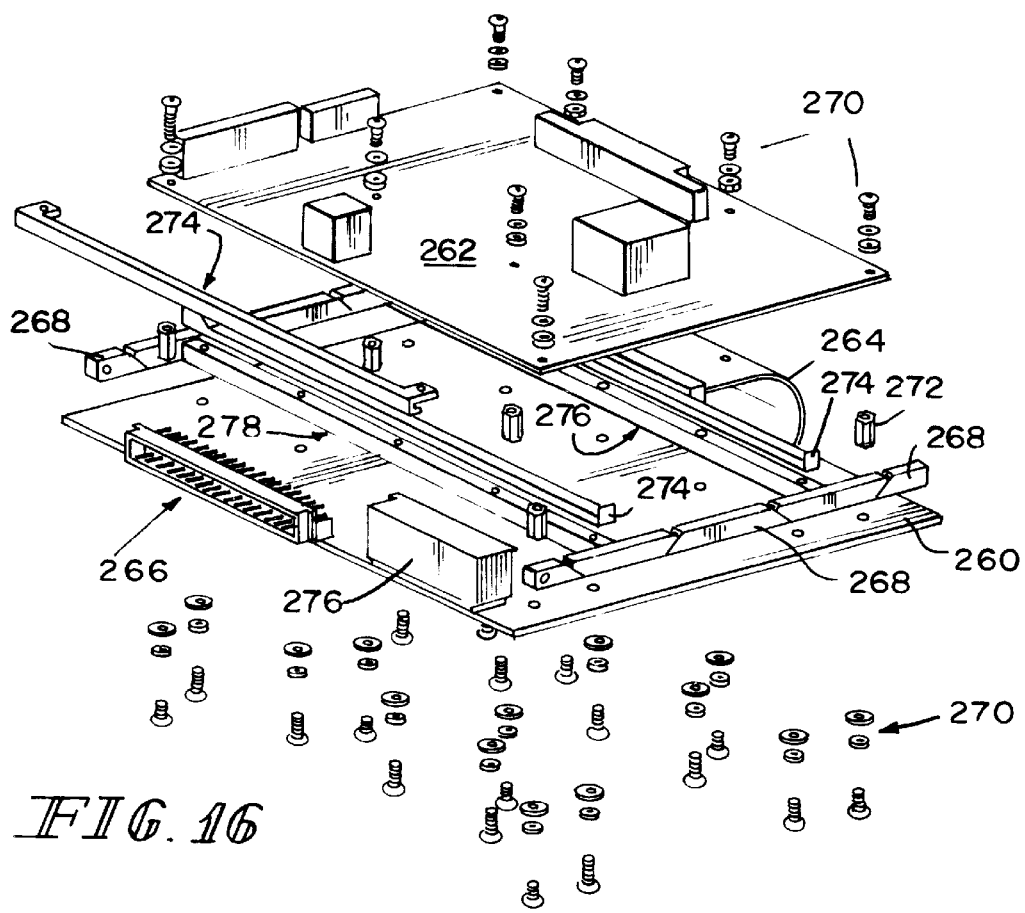
FIG. 16 provides an exploded view of the single board circuit assembly of the present invention.

FIG. 16 shows the single board computer (SBC) assembly 212. The SBC assembly 212 comprises a single board computer SBC 260 and a printed circuit board SBC PCB 262 held together by screws 270 in a spaced apart relation by spacers 272. An electrical bridge 264 is positioned adjacent an edge of SBC plates 260 to connect SBC 260 to SBC PCB 262 via connector 261. The SBC Assembly 212 also comprise a LON adaptor connecting the SBC 260 to the LON interface into the trainline communication controller. The SBC assembly 212 further comprises and edge connector 266 on SBC PCB which will mate with edge connector 226 on second printed circuit board 164.

The lateral edges of the single board computer assembly 212 will include card locks 268. These card locks 268 are configured to retain and hold SBC assembly 212 within grooves 173 formed in both the rear wall 175 and card guide wall 174. Stiffener bars 274 are fastened into the SBC assembly 212 and positioned between the SBC 260 and SBC PCB 262. As shown, stiffener bars 274 may also be positioned around a lateral edge of the SBC Assembly 212. Foam gaskets 280 may also be positioned between the SBC 260 and the SBC PCB 262. A battery 276 supplying direct current to the SBC Assembly 212 is provided on the SBC PCB 262.

Also included in trainline communication controller 140 is a network interface assembly 214 as shown in FIG. 7. The network interface assembly 214 will include a neur on chip as part of a LON works communication system, which was designed and developed by the Echelon Corporation of Palo Alto, Calif. The LON interface, as developed by the Echelon Corporation, has been re-configured to assume a card-type assembly as in 214, which will slidably engage grooves 173 in card guide wall 174 and rear wall 175 to integrate into trainline communication controller 140.

As shown in FIG. 7, the trainline communication controller 140 will also comprise an input/output interface assembly 216. The input/output interface assembly 216 engages grooves 173 in the card guide wall 174 and rear wall 175 at a lateral edge, and mates with the second printed circuit board 164 at edge connectors 230, which are best viewed in FIG. 8. Card locks may also be used to retain the input/output interface assembly 216 in the grooves 173.

In order to assemble the trainline communication controller 140, the front plate 144 is fastened to the front plate printed circuit board 145 using spacer-fasteners 149. Then, the front plate 144 is brought flush with receptacle plates 147, and fastened flush there to with fasteners 159. The electrical bridge 232 is installed to connect the second printed circuit board 164 to the front plate assembly 142. Gasket 152 is then installed into recess 153 in the front plate 144, and o-ring gasket 154 is installed into recess 155 in the front plate 144.

The second printed circuit board 164 is passed through the pass-through opening 177 in the card guide wall 174. The card guide wall 174 and rear plate 175 are preassembled to the base plate 162 by fasteners 179 and 202.

Fasteners 165 are then passed through openings in the second printed circuit board 164. After passing through the openings in the second plate printed circuit board 164, the fasteners 165 engage spacers 170, which are fastened into a base plate 162. The fasteners 165 and spacers 170 cooperate to hold the base plate 162 in a spaced-apart relation to the second plate printed circuit board 164. The front plate 144 is secured to the base plate 162 by fasteners 150.

The front foot 166 and rear foot 168 are attached to the base plate 162 by fasteners 172. Alternatively, an L-Shaped LSI mounting 169 with fasteners 167 maybe used to firmly attach the base plate 162 to a rail car.

Gasket 196 is then positioned along edge 197 of the base plate, gasket 260 on surface 173 of back plate 175 and gasket 152 on surface 153 of front plates 114 and cover 194 is attached to the housing using a plurality of screws and washers 195. Preferably, the cover 194 forms a relatively air tight chamber, which prevents the build up of dirt and dust, which can impair electrical connections.

Although the present invention has been described and illustrated in detail, it is to be clearly understood that the same is by way of illustration an example only, and is not to be taken by way of limitation. The spirit and scope of the present invention are to be limited only by the terms of the appended claims.

We claim:

1. A trainline communication controller for placement on a rail car or locomotive of a train in order to form a network, the communication controller comprising:
    a housing having a front plate assembly which includes a plurality of external electrical receptacles;
    plurality of circuits including surface connectors in the housing; and
    a printed circuit board assembly having a portion adjacent the front plate assembly and including board connectors mating directly with the surface connectors of the circuits and where in the external electrical receptacles are mounted on a different surface of the printed circuit board assembly than the board connectors.

2. The trainline communication controller of claim 1, wherein the printed circuit board assembly includes: a first printed circuit board adjacent the front plate assembly and to which each receptacle is mounted;
    a second print circuit board having the board connectors mounted thereto; and
    a connector bridge enabling electric communication between the first and second printed circuit boards.

3. The trainline communication controller of claim 2, wherein the first printed circuit is substantially perpendicular to the second printed circuit board.

4. The trainline communication controller of claim 1, the housing further comprising a back wall, a base and a cover cooperating with the front plate assembly to form a substantially sealed chamber enveloping the printed circuit boards.

5. The trainline communication controller as in claim 4, further including a breather plug configured to open when pressure inside the sealed chamber reaches a predetermined level.

6. The trainline communication controller of claim 1, further comprising a switch on the front plate assembly and electrically connected to a power supply assembly, the switch enabling selective activation of the trainline communication controller.

7. The trainline communication controller of claim 1, wherein the switch comprises a six-pin plug.

8. The trainline communication controller of claim 7, further comprising a light emitting diode on the front wall assembly and electrically connected to the front wall assembly printed circuit board.

9. The trainline communication controller of claim 7, wherein a pair of pins from the plug correspond to the positive and negative of the trainline input; and a pair of pins on the plug correspond to the positive and negative of the trainline outputs.

10. The trainline communication controller as in claim 8, further including a receptacle on the printed circuit board and a wiring harness connecting the switch and light emitting diode to the receptacle.

11. The trainline communication controller as in claim 2, wherein the housing include a base and at least one spacer positioned between the base and the second printed circuit board to maintain space between the second printed circuit board and the base.

12. The trainline communication controller as in claim 1, wherein the circuits are on boards and a pair of opposed card guide wall shaving grooves to receive lateral edges of the circuit boards.

13. The trainline communication controller as in claim 12, including an opening in one of the guide walls, and at least a portion of the second printed circuit board extends the opening.

14. The trainline communication controller of claim 2, further comprising at least one spacer positioned between the plate of the front plate assembly and the first circuit board to create a spaced-apart relation there between.

15. The trian line communication controller of claim 1, wherein one of the circuits is a power supply assembly which comprises:
   a mounting plate;
   a power supply module coupled to the mounting plate and having an edge mating with an edge connector; and,
   a filter coupled to the mounting plate, the filter having an edge mating with an edge connector.

16. The trainline communication controller of claim 15, further comprising a stand off positioned between the filter and the mounting plate to form and maintain between the filter and the mounting plate.

17. The trainline communication controller as in claim 15, wherein the mounting plate is a heat-sink plate comprising aluminum.

18. The trainline communication controller of claim 1, wherein one of the circuits is a single board computer assembly in electric communication with communication network adaptor.

19. The trainline communication controller of claim 18, the single board computer assembly comprising:
   a single board computer coupled to a single computer board printed circuit board; and
   at least one separator positioned between the single board computer printed circuit board and the single board computer in order to maintain a spaced-apart relation.

20. The trainline communication controller of claim 19, further comprising at least one stiffener bar fastened to one of the single board computer or the single board computer printed circuit board and positioned between the single board computer and the single board computer printed circuit board.

21. The trainline communication controller of claim 19, further comprising circuitry integrally formed on single board computer and the single board computer printed circuit board; and,
   further including a connector assembly creating an electrical bridge from the plate of the single board computer assembly to the circuit board of the single board computer assembly.

22. The trainline communication controller as in claim 19, wherein the connector is on a lateral edge of the single board computer printed circuit board.

* * * * *

UNITED STATES PATENT AND TRADEMARK OFFICE
CERTIFICATE OF CORRECTION

| | | |
|---|---|---|
| PATENT NO. | : 6,582,031 B2 | Page 1 of 1 |
| APPLICATION NO. | : 09/944110 | |
| DATED | : June 24, 2003 | |
| INVENTOR(S) | : Gary S. Newton et al. | |

It is certified that error appears in the above-identified patent and that said Letters Patent is hereby corrected as shown below:

In column 4, line 45, after "edge" insert --or board--; line 49, after "pair" insert --of--.

In column 5, line 15, after "edge" insert --or surface--; line 17, after "edge" insert --or surface-- and line 36, delete "and" and insert --an--; after "edge" insert --or surface--.

In column 6, line 48, Claim 1, before "plurality" insert --a--; line 53, "where in" should read --wherein--.

Signed and Sealed this

Fifth Day of June, 2007

JON W. DUDAS
*Director of the United States Patent and Trademark Office*